(12) United States Patent
Frank

(10) Patent No.: US 7,962,727 B2
(45) Date of Patent: Jun. 14, 2011

(54) METHOD AND APPARATUS FOR DECOMPRESSION OF BLOCK COMPRESSED DATA

(75) Inventor: Michael Frank, Sunnyvale, CA (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 369 days.

(21) Appl. No.: 12/329,236

(22) Filed: Dec. 5, 2008

(65) Prior Publication Data

US 2010/0146246 A1 Jun. 10, 2010

(51) Int. Cl.
  G06F 7/38 (2006.01)
  G06F 9/00 (2006.01)
  G06F 9/44 (2006.01)
  G06F 15/00 (2006.01)
(52) U.S. Cl. ........................................ 712/220; 710/68
(58) Field of Classification Search ........................ None
  See application file for complete search history.

(56) References Cited

U.S. PATENT DOCUMENTS

| | | | | |
|---|---|---|---|---|
| 5,548,751 A | * | 8/1996 | Ryu et al. ................................. | 1/1 |
| 5,946,716 A | * | 8/1999 | Karp et al. ......................... | 711/207 |
| 6,553,457 B1 | * | 4/2003 | Wilkins et al. ................. | 711/113 |
| 6,728,722 B1 | * | 4/2004 | Shaylor ................................. | 1/1 |
| 7,068,192 B1 | * | 6/2006 | Dean et al. ....................... | 341/67 |

* cited by examiner

*Primary Examiner* — Eddie P Chan
*Assistant Examiner* — Corey Faherty
(74) *Attorney, Agent, or Firm* — Meyertons Hood Kivlin Kowert & Goetzel, P.C.; Jeffrey C. Hood

(57) ABSTRACT

System and method for decompressing data. A compressed data stream including contiguous variable length blocks is received, each block including multiple contiguous variable length data fields and a tag portion that includes multiple contiguous tag fields corresponding respectively to the data fields. Each tag field stores a tag value specifying a size of a respective field in the block. A current variable length block is stored. A single machine instruction of a processor is executed that analyzes the tag portion of the current block, and creates a control pattern, storing the control pattern in a first register of the processor. The control pattern is configured to unpack the variable length data fields of the current variable length block into corresponding uniform data fields. The contiguous variable length data fields of the current variable length block are decompressed using the control pattern, thereby decompressing the compressed data stream.

24 Claims, 5 Drawing Sheets

METHOD AND APPARATUS FOR DECOMPRESSION OF BLOCK COMPRESSED DATA

FIELD OF THE INVENTION

The present invention relates to the field of data decompression, and more particularly to decompressing block compressed data.

DESCRIPTION OF THE RELATED ART

With the advent and continued evolution of the information age, the communication, storage, and retrieval of information by computers has become a crucial part of the technical infrastructure underlying large portions of the economy and society. To maximize the efficiency of such operations, data is commonly encoded, e.g., compressed or compacted, to minimize transmission time/bandwidth and storage footprint (cache hit rate and total amount of memory). However, there are many different compression or encoding formats, each of which may have different characteristics, e.g., compression ratios, commensurate data types, and so forth. Data compressed in variable length bit level packed formats requires a great deal of bit manipulation.

For example, one common encoding/decoding technique is disclosed in U.S. Pat. No. 7,068,192, owned by Google, Inc. The approach disclosed therein is directed to encoding and decoding blocks of variable-length data, where data values are stored in a data structure that includes a data field and a tag field corresponding to the data field. The data field includes variable-length data subfields containing variable-length data (e.g., 1 to N bytes of data). The tag field includes corresponding tag subfields, where each tag subfield includes tag bits indicating the length of the data stored in the corresponding data subfield. As described in the patent, the data values are decoded or decompressed using a look-up table of offsets and masks. However, this decoding technique requires a significant number of processor instructions (and thus, cycles), including a significant number of external memory references due to the table look-ups and mask retrievals, thus increasing the cache footprint.

Thus, improved systems and methods for decoding block compressed data are desired.

SUMMARY OF THE INVENTION

Various embodiments of a system and method for decompressing variable length block compressed data are presented.

A compressed data stream may be received that includes one or more contiguous variable length blocks. Each variable length block may include a plurality of contiguous variable length data fields, and a tag portion that includes a plurality of contiguous tag fields corresponding respectively to the plurality of variable length data fields. Each tag field may store a tag value specifying a size of a respective variable length data field in the variable length block.

A current variable length block of the one or more contiguous variable length data blocks may be stored, e.g., for subsequent processing. A single machine instruction of a processor may be executed that analyzes the tag portion of the current variable length block, creates a control pattern, and stores the control pattern in a first register of the processor. The control pattern may be configured to unpack the variable length data fields of the current variable length block into corresponding uniform data fields.

Since the tag or control portion of the block specifies the respective sizes of the associated variable length data fields, also referred to as "sub blocks", in one embodiment, a first part of the instruction may decode the start position of each sub block of data based on the tag byte components {a ... d}, where the length (in bytes) of each compressed sub block is the value of the tag field+1:

offset[0]=1; this is the next byte after the tag.

offset[1]=offset[0]+($a$+1)=$a$+2;

offset[2]=offset[1]+($b$+1)=$a$+$b$+3;

offset[3]=offset[2]+($c$+1)=$a$+$b$+$c$+4.

In this embodiment, offset[n] refers to the offset or relative position of compressed data field or sub block n, with respect to the beginning of the block, i.e., the start of the tag portion. Note that the value of the tag field must be incremented by 1 because the tag field values range from 0 to 3, whereas the data field sizes range from 1 to 4 (bytes), and so 1 must be added to each tag value in computing the sizes and corresponding offsets of the data fields. Given the values of the tag fields (a, b, c, and d), the offsets or positions for each compressed data field may be computed. Moreover, given this information and the fact that the tags and data fields are contiguous, the position or offset of the start of the next compressed data block may also be computed:

next=offset[3]+($d$+1)=$a$+$b$+$c$+$d$+5.

Note that as the sizes are accumulated to compute the subsequent offset, these "+1's" similarly accumulate, resulting in the "+5" for the next block offset or position.

In some embodiments, the data may always arrive from memory aligned such that the compressed block of data starts at the least significant byte of a 128 bit register. Thus, the compressed data may be loaded into a 128-bit register (data path) so that the byte with the lowest address in memory is placed in the rightmost position in the register, consistent with the "little endianess" of the x86 architecture.

Since the incoming data has a variable width for each double word, the data must be "spread out" and gaps filled, e.g., with either the replicated sign bit of the most significant non zero byte or with zeros. Filling with zeros may be preferred, as doing so does not require manipulating source byte indices.

Note that the compressed block (after removing the control byte) is always smaller than or at most as big/wide as the 128-bit register. After the unpacking process, the sub-blocks may always align to the right side of each of the four 32-bit DWORD locations in the register. Based on the application, either filling with zeros or sign extending may be preferred. Both techniques are useful, and so in some embodiments, an instruction may be provided for each.

The control pattern defines if the data deposited into a destination byte is a copy of the selected source byte, e.g., indicated by the 5 least significant bits, or if the data will be zeroed out. In one embodiment, if a byte is zeroed out, the upper 3 bits may need to be 100. For each byte in a double word $DW_i$, the sum of the control pattern $CP_i$ and offset[i] may determine the content.

Said in a slightly different way, in one embodiment, e.g., for the PPERM instruction, the lower 5 bits may select one of the 32 bytes in the two source registers. A control pattern with the upper 3 bits=='100' will zero the destination byte, independent of the selected source byte, thereby overriding the lower 5 bits. Thus, the sizes and/or relative positions of the variable length (compressed) data fields (determined based on the tag fields of the tag or control byte) may be used to determine a control pattern for decompressing the data.

As a specific example, consider a block compressed (hexadecimal) code: 0x18.3C.51.24.33.42.58.0B, with a length of 8 bytes, and where the block starts with the lowest address is on the left side. The control byte is 00.01.10.00, i.e., 0x18. The data pattern is 3C.512433.4258.0B (with address increasing from right to left), which is 7 bytes in size, and which expands to 16 bytes as follows: the control field for the rightmost byte is 00, so there is one byte for this position, specifically, 0x3C that is expanded to 32-bits, i.e., 0x00.00.00.3C; the control field for the next byte is 10, and so there are 3 bytes in the source, specifically, 0x512433, which is expanded to 0x00.51.24.33; the next control field is 01, which indicates 2 source bytes, specifically, 0x4258, which is expanded to 0x00.00.42.58; and the last control field is 00, which indicates one byte, 0x0B, which is expanded to 0x00.00.00.0B. Thus, the completed expanded block code fills the 128-bit register with: 0x00.00.00.0B.00.00.42.58.00.51.24.33.00.00.00.3C.

The plurality of contiguous variable length data fields of the current variable length block may thus be decompressed using the control pattern, where the decompressing operates to decompress the compressed data stream.

BRIEF DESCRIPTION OF THE DRAWINGS

A better understanding of the present invention can be obtained when the following detailed description of the preferred embodiment is considered in conjunction with the following drawings, in which.

Figure 1:
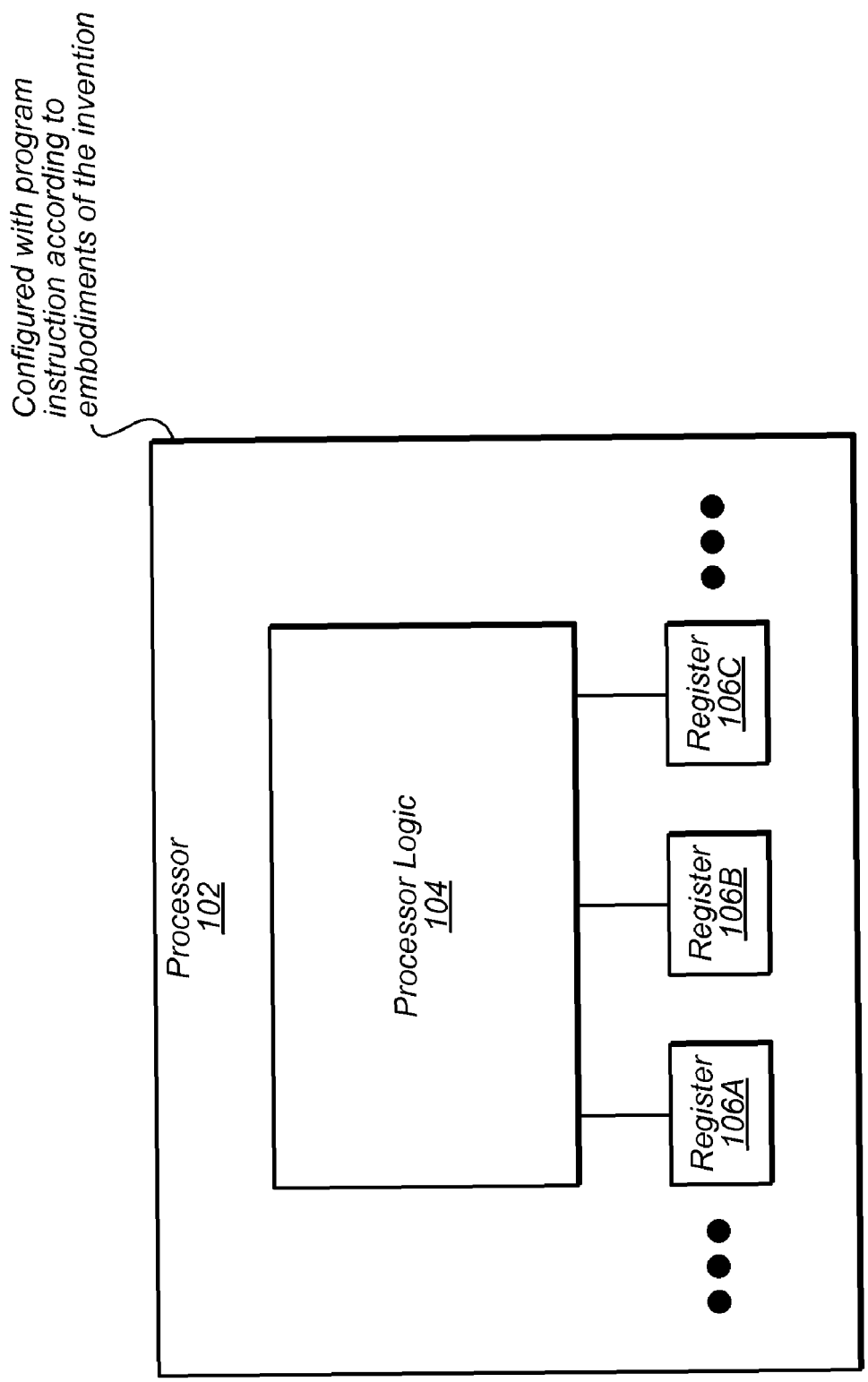
FIG. 1 illustrates a processor configured to decode variable length block compressed data, according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION OF THE INVENTION

FIG. 1

Computer Processor

FIG. 1 illustrates a processor 102 configured to implement the methods described herein. As shown in FIG. 1, the processor 102 may include processor logic 104 and a plurality of on-chip registers, e.g., registers 106A, 106B, and 106C (among others). Note that the number of registers shown and their connectivity are exemplary only, and are not intended to limit the processors contemplated to any particular number, type, or arrangement of registers.

As mentioned above, accessing external memory, i.e., off-processor memory, for table lookups, mask retrieval, etc., can limit performance of decompression operations. Thus, the use of onboard registers, such as registers 106A, 106B, and 106C, can improve the performance of decompression operations, as will be discussed in more detail below.

Note, however, that the introduction of additional memory registers in a processor architecture may require special modifications of an operating system, which, in general, may not be feasible. For example, the addition of extra registers in an x86 processor architecture, e.g., to support one or more special decompression machine instructions (i.e., assembly instructions), may require modifications to the Microsoft Windows operating system. However, in some embodiments, onboard registers originally provided for one purpose may be available for use by such machine instructions. For example, in one embodiment, multimedia registers provided for support of multimedia extension instruction sets (e.g., the Streaming SIMD Extensions (SSE) instruction set) may be used by a special decompression machine instruction, as described herein. Thus, in one embodiment, registers 106A, 10B, and 106C, and possibly others, may comprise multimedia extension registers normally used for performing multimedia operations, as well as such standard onboard registers as rAX, rSI, etc. Such dual use of onboard resources may thus facilitate improvements in performance and efficiency without requiring additional hardware resources. Since each of these registers is 128 bits wide (or long), they may provide ample space for storing input data, results data, and control patterns, among other items used to decompress the data.

Embodiments of the present invention may provide a new machine instruction for decompressing block encoded data, and in some embodiments, may address one or more of the following issues:

1) Bit manipulation—extraction of the data field may be performed by the PPERM instruction of the AMD (Advanced Micro Devices) SSE5 instruction set extensions, or as an alternative, the PSHUFB instruction introduced by SSSE3.

2) Variable length of the compressed data block—this aspect makes it difficult to calculate the address of the next data block, for example, to "fast-forward" in a compressed data stream.

3) Expansion of data into a fixed format for manipulation—such fixed formats are common for arithmetic, compare, and text analysis, among other applications.

As will be discussed below in more detail, and in accordance with the above, in one embodiment, the processor 102 may be configured for decompressing a block compressed data stream that includes one or more contiguous variable length data blocks, where each variable length data block includes multiple contiguous variable length data fields, e.g., fields of a variable number of bytes. As indicated above, the processor may include a plurality of registers (e.g., registers 106A, 106B, and 106C, and possibly others), as well as processor logic which may be configured with a single machine instruction that may analyze the control/tag byte of a data block, and return the size of the data field in a general purpose register and a control pattern in an xmm register. The control pattern may follow the rules required as an input format to permutation instructions (e.g., PSHUFB, PPERM).

Block Variable Length Integer Encoding

One block variable length integer encoding format to which the decoding techniques described herein may be applied is disclosed in U.S. Pat. No. 7,068,192, assigned to Google, Inc., where encoding format uses a control byte for a 128-bit block of data. A control byte is placed in front of the data sequence and uses two bits for each 32-bit sub block to indicate the number of valid (non-zero) bytes in the double word:

TABLE 1

| | Control Byte: |
|---|---|
| Descriptor | Control Field (one per double word) |
| | 00: Data size = 1 Bytes |
| | 01: Data size = 2 Bytes |
| | 10: Data size = 3 Bytes |
| | 11: Data size = 4 Bytes |

Note that the shortest possible sequence consists of 5 bytes—1 control byte with all four fields equal to zero, plus the 4 bytes of data. In the decoding process, this sequence would be expanded into a 128-bit block where the least significant byte of each double word uses one byte of data from the 4-byte data field, and the other 3 bytes of each double word would be filled with zero or sign-extended from the least significant byte. However, as noted above, decoding data in this format using current (prior art) techniques requires numerous accesses to off-chip resources, and thus is computationally expensive and slow.

Embodiments of the systems and methods disclosed herein may decode such block compressed variable length integers in a manner that avoids such off-chip access, resulting in significant performance improvement.

FIG. 2

Exemplary Data Retrieval System

Figure 2:
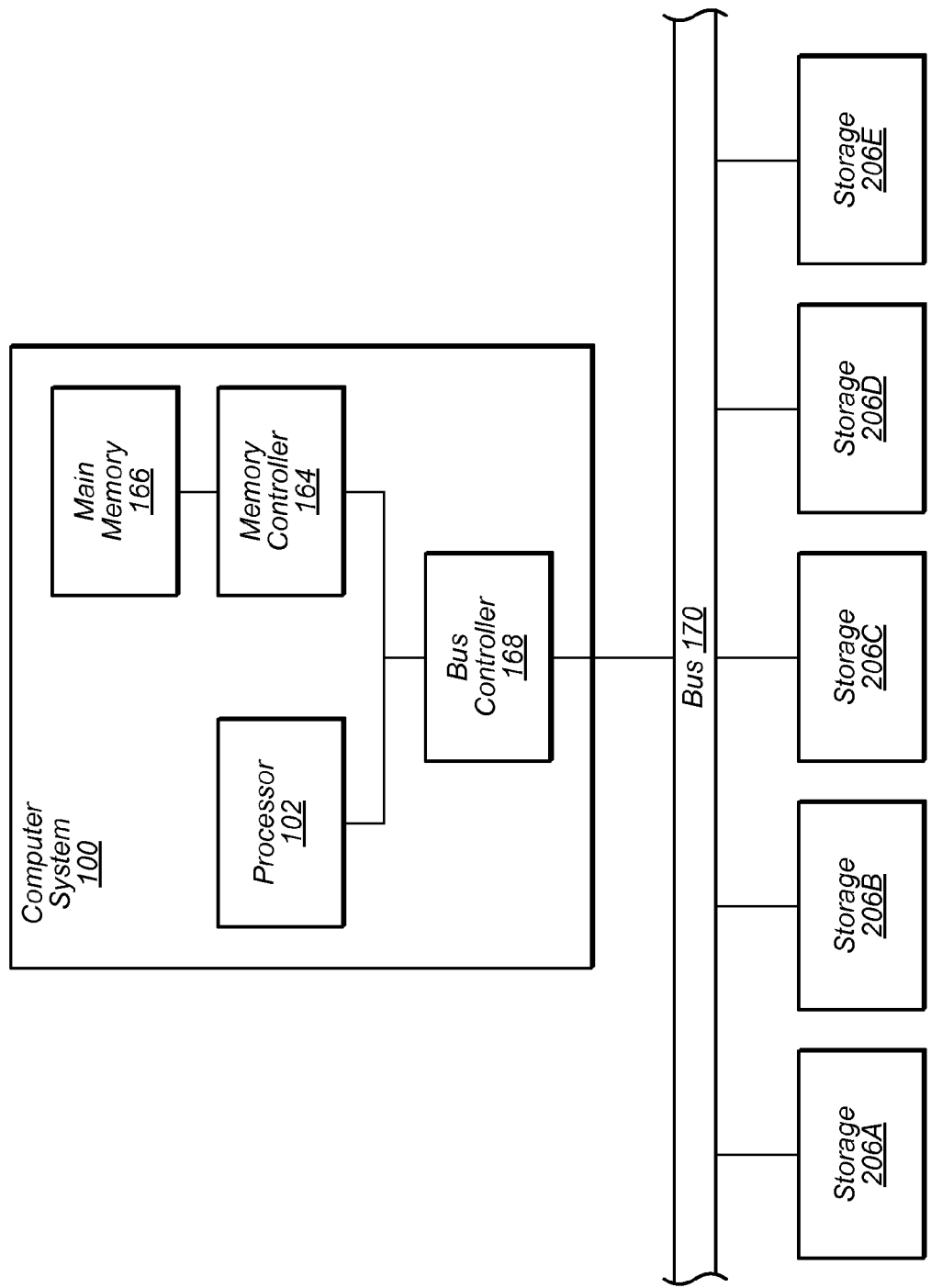
FIG. 2 illustrates an exemplary data server system, according to an embodiment of the present invention.

FIG. 2 is a block diagram representing one embodiment of an exemplary data retrieval system that may utilize and benefit from embodiments of the techniques disclosed herein. As may be seen, this system includes a computer system 100 and multiple storage devices 206A, 206B, 206C, 206D, and 206E, e.g., mass storage devices hosting one or more databases, which may be referred to collectively as storage devices 206, coupled to the computer system 100 via bus 170, e.g., a local area network (LAN), or a wide area network (WAN), such as the Internet.

As FIG. 2 shows, the computer system 100 includes a processor 102, e.g., an embodiment of the processor of FIG. 1, coupled to a main memory 166 through a memory controller 164. These components coupled to the bus 170 through bus controller 168. Note that elements of the computer not necessary to understand the present description have been omitted for simplicity. In some embodiments the computer system 100 has an x86 architecture. Note, however, that the computer system, bus, and storage devices, are meant to be exemplary only, and that other architectures, numbers and arrangements of storage devices, etc., may be used as desired. For example, in some embodiments, the data retrieval system may include multiple computer systems, e.g., blade servers, coupled to a distributed mass storage system accessible over a network, e.g., a storage area network (SAN). Additionally, noted that data retrieval systems are but one example of systems that may benefit from the techniques described herein, and that any systems or applications that utilize or implement data compression as described herein are contemplated as falling within the scope of the present invention.

FIG. 3

Method for Decoding Variable Length Block Compressed Data

Figure 3:
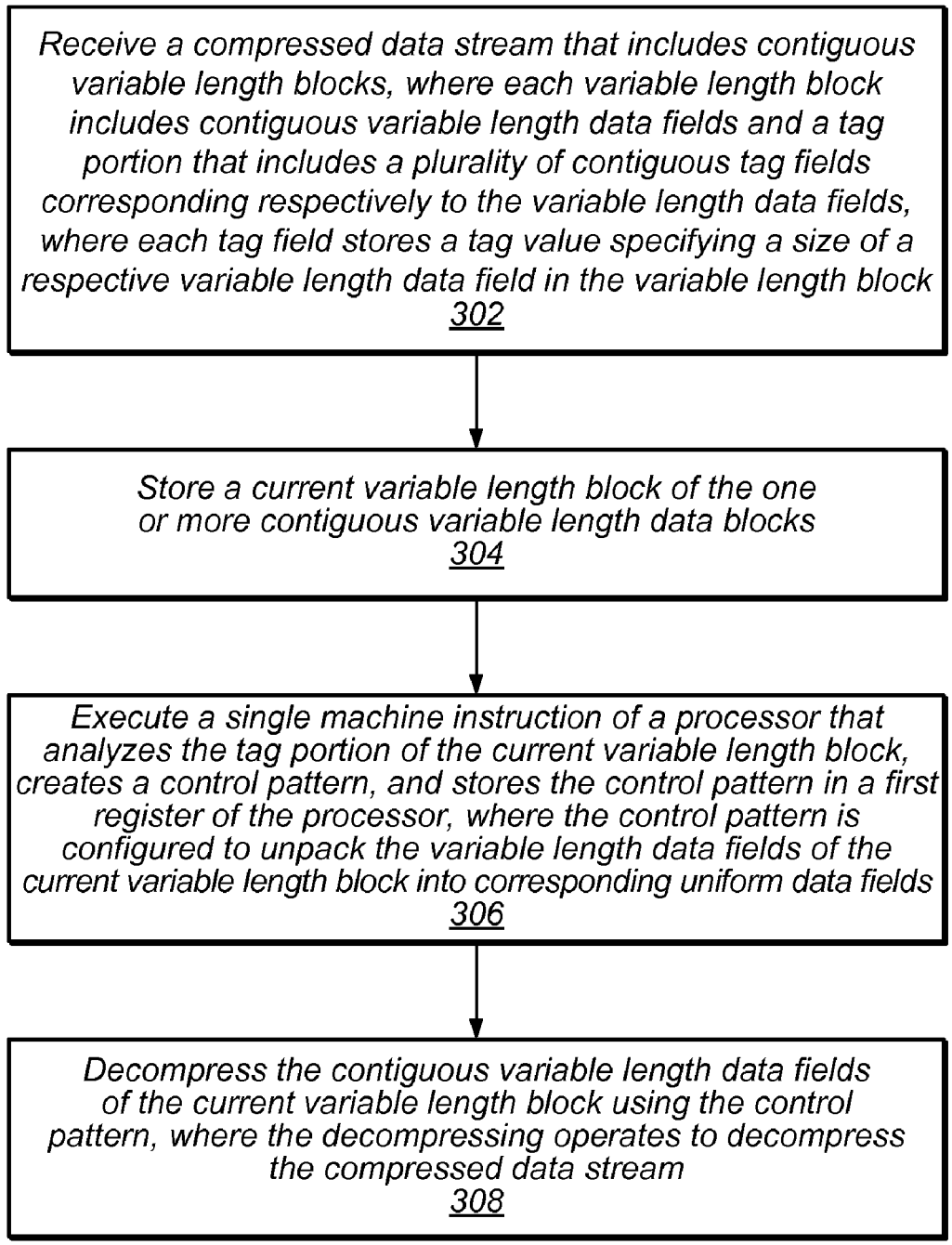
FIG. 3 is a flowchart of a method for decode variable length block compressed data, according to an embodiment of the present invention.

FIG. 3 illustrates a method for decoding of variable length block compressed data. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a compressed data stream may be received that includes one or more contiguous variable length blocks. Each variable length block may include a plurality of contiguous variable length data fields, and a tag portion that includes a plurality of contiguous tag fields corresponding respectively to the plurality of variable length data fields. Each tag field may store a tag value specifying a size of a respective variable length data field in the variable length block. Thus, each variable length block includes a tag portion that indicates the size of the variable length data fields.

Figure 4:
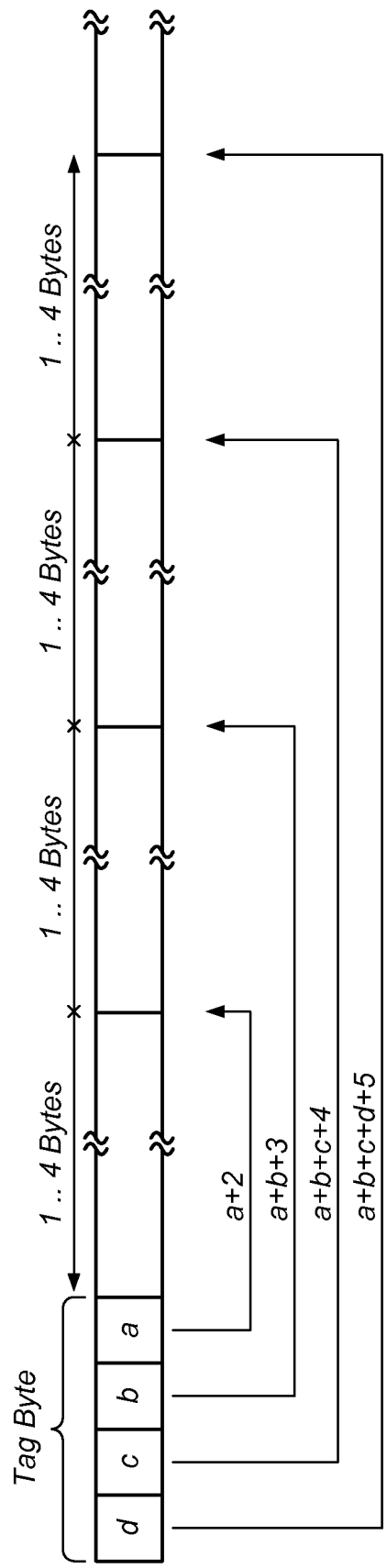
FIG. 4 illustrates a variable length compressed data block, according to an embodiment of the present invention.

FIG. 4 illustrates an exemplary variable length block, according to one embodiment. As FIG. 4 shows, in this embodiment, the tag portion of the variable length block is a control or tag byte that includes four 2-bit tag indicators, presented above with respect to Table 1. As also shown in FIG. 4, after the tag byte are four contiguous variable length data fields, each from 1 to 4 bytes in size. As Table 1 shows, each indicator in the tag or control byte specifies the size of a corresponding (compressed) 32-bit (e.g., a double-word, when decompressed) sub block to indicate the number of valid (non-zero) bytes in the double word. However, it should be noted that the block of FIG. 4 is meant to be exemplary, and that other sizes and number of tag and data fields may be used as desired.

In 304, a current variable length block of the one or more contiguous variable length data blocks may be stored. In other words, one of the variable length blocks of the compressed data stream of 302, e.g., a next (or first) block may be stored for subsequent processing, as will be described below.

In 306, a single machine instruction of a processor may be executed that analyzes the tag portion of the current variable length block, creates a control pattern, and stores the control pattern in a first register of the processor. The control pattern may be configured to unpack the variable length data fields of the current variable length block into corresponding uniform data fields.

Since the tag or control portion of the block specifies the respective sizes of the associated variable length data fields, also referred to as "sub blocks", in one embodiment, a first part of the instruction may decode the start position of each sub block of data based on the tag byte components {a . . . d}, where the length (in bytes) of each compressed sub block is the value of the tag field+1:

offset[0]=1; this is the next byte after the tag.

offset[1]=offset[0]+($a$+1)=$a$+2;

offset[2]=offset[1]+($b$+1)=$a$+$b$+3;

offset[3]=offset[2]+($c$+1)=$a$+$b$+$c$+4.

In this embodiment, offset[n] refers to the offset or relative position of compressed data field or sub block n, with respect to the beginning of the block, i.e., the start of the tag portion. Note that the value of the tag field must be incremented by 1 because the tag field values range from 0 to 3, whereas the data field sizes range from 1 to 4 (bytes), and so 1 must be added to each tag value in computing the sizes and corresponding offsets of the data fields.

As may be seen in FIG. 4 and the above enumeration of offsets, given the values of the tag fields (a, b, c, and d), the offsets or positions for each compressed data field may be computed. Moreover, given this information and the fact that the tags and data fields are contiguous, the position or offset of the start of the next compressed data block may also be computed:

next=offset[3]+(d+1)=a+b+c+d+5.

Note that as the sizes are accumulated to compute the subsequent offset, these "+1's" similarly accumulate, resulting in the "+5" for the next block offset or position.

In some embodiments, the data may always arrive from memory aligned such that the compressed block of data starts at the least significant byte of a 128 bit register. Thus, the compressed data may be loaded into a 128-bit register (data path) so that the byte with the lowest address in memory is placed in the rightmost position in the register, consistent with the "little endianess" of the x86 architecture.

Since the incoming data has a variable width for each double word, the data must be "spread out" and gaps filled, e.g., with either the replicated sign bit of the most significant non zero byte or with zeros. Filling with zeros may be preferred, as doing so does not require manipulating source byte indices.

Note that the compressed block (after removing the control byte) is always smaller than or at most as big/wide as the 128-bit register. After the unpacking process, the sub-blocks may always align to the right side of each of the four 32-bit DWORD locations in the register. Based on the application, either filling with zeros or sign extending may be preferred. Both techniques are useful, and so in some embodiments, an instruction may be provided for each.

The control pattern defines if the data deposited into a destination byte is a copy of the selected source byte, e.g., indicated by the 5 least significant bits, or if the data will be zeroed out. In one embodiment, if a byte is zeroed out, the upper 3 bits may need to be 100. For each byte in a double word $DW_i$, the sum of the control pattern $CP_i$ and offset[i] may determine the content.

Said in a slightly different way, in one embodiment, e.g., for the PPERM instruction, the lower 5 bits may select one of the 32 bytes in the two source registers. A control pattern with the upper 3 bits=='100' will zero the destination byte, independent of the selected source byte, thereby overriding the lower 5 bits.

Figure 5:
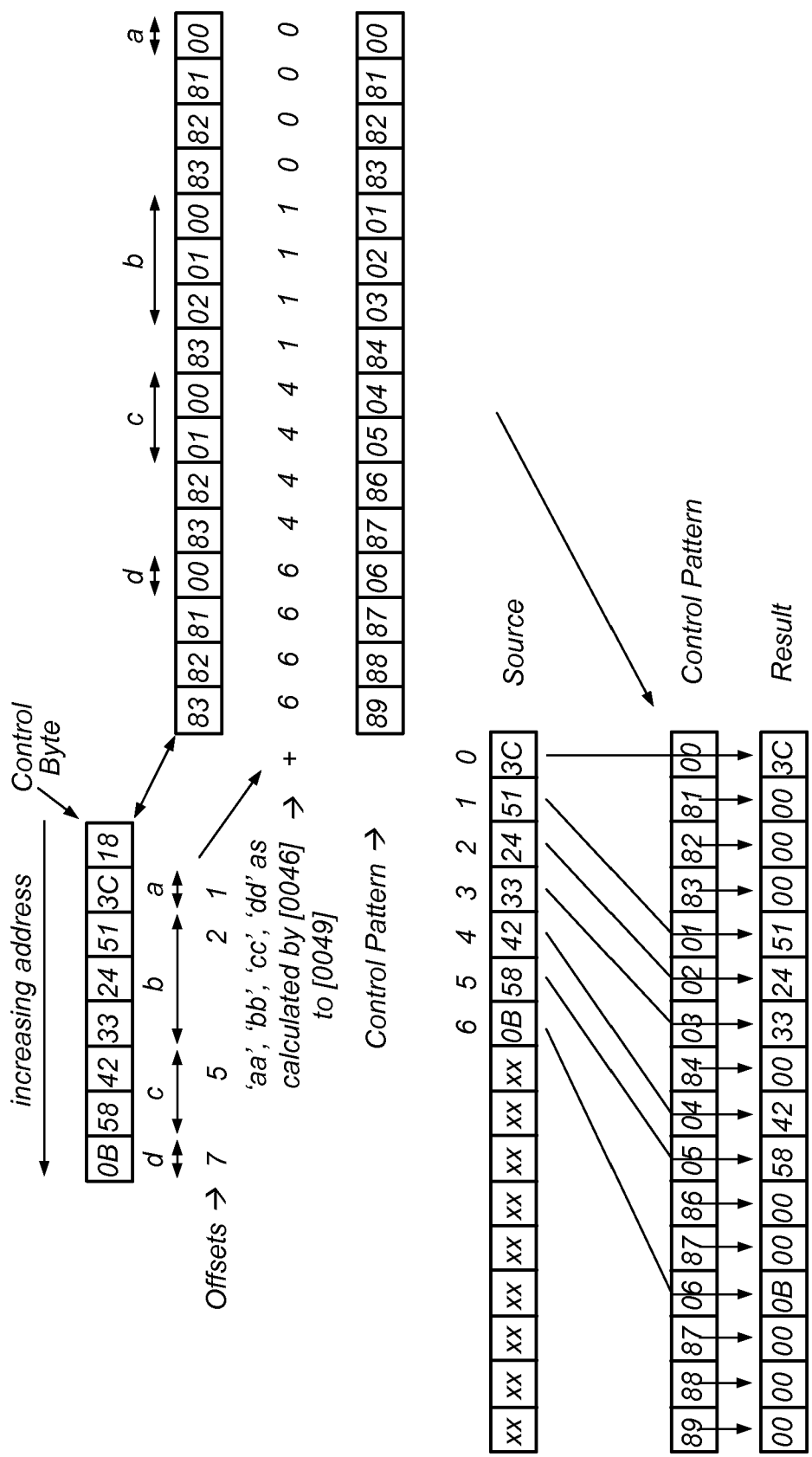
FIG. 5 illustrates decompression of an exemplary variable length compressed data block, according to an embodiment of the present invention.

For a more specific example, consider a block compressed (hexadecimal) code: 0x18.3C.51.24.33.42.58.0B, with a length of 8 bytes, and where the block starts with the lowest address is on the left side. FIG. 5 illustrates an exemplary decoding of this example compressed block.

As FIG. 5 shows, the control byte is 00.01.10.00, i.e., 0x18. The data pattern is 3C.512433.4258.0B (with address increasing from right to left), which is 7 bytes in size, and which expands to 16 bytes: As may be seen, the control field for the rightmost byte is 00, so there is one byte for this position, specifically, 0x3C that is expanded to 32-bits, i.e., 0x00.00.00.3C; the control field for the next byte is 10, and so there are 3 bytes in the source, specifically, 0x512433, which is expanded to 0x00.51.24.33; the next control field is 01, which indicates 2 source bytes, specifically, 0x4258, which is expanded to 0x00.00.42.58; and the last control field is 00, which indicates one byte, 0x0B, which is expanded to 0x00.00.00.0B. Thus, the completed expanded block code fills the 128-bit register with: 0x00.00.00.0B.00.00.42.58.00.51.24.33.00.00.00.3C.

In one embodiment, the control pattern for each data field (e.g., double word) may be generated using the following base sequence:

TABLE 2

Control Pattern Base Sequences

| Control Field [one per double word] | Base Sequence |
| --- | --- |
| 00: Data size = 1 Bytes | 83.82.81.00 + {aa.bb.cc.dd} |
| 01: Data size = 2 Bytes | 83.82.01.00 + {aa.bb.cc.dd} |
| 10: Data size = 3 Bytes | 83.02.01.00 + {aa.bb.cc.dd} |
| 11: Data size = 4 Bytes | 03.02.01.00 + {aa.bb.cc.dd} |

For each double word, "aa", "bb", "cc", "dd", is the offset calculated above—note that the offset is smaller by one since the address that will be used is already pointing to the first element of the data field. This may be required to support uncompressed blocks that have 128 bits of data field. Thus:

aa:=00 bb:=a+1 cc:=a+b+2 dd:=a+b+c+3

Thus, the sizes and/or relative positions of the variable length (compressed) data fields (determined based on the tag fields of the tag or control byte) may be used to determine a control pattern for decompressing the data.

In 308, the plurality of contiguous variable length data fields of the current variable length block may be decompressed using the control pattern, where the decompressing operates to decompress the compressed data stream.

Thus, in some embodiment, a processor may include an input configured to receive a compressed data stream that includes one or more contiguous variable length blocks. Each variable length block may include a plurality of contiguous variable length data fields, and a tag portion that includes a plurality of contiguous tag fields corresponding respectively to the plurality of variable length data fields. Each tag field may store a tag value specifying a size of a respective variable length data field in the data block.

The processor may also include a first register for storing a current variable length block of the one or more contiguous variable length data blocks, and an execution unit configured to execute a single first machine instruction of the processor to analyze the tag portion of the current variable length block, and create a control pattern and store the control pattern in a second register of the processor. The control pattern is configured to unpack the variable length data fields of the current variable length block into corresponding uniform data fields. The execution unit may be further configured to execute one or more second machine instructions to decompress the plurality of contiguous variable length data fields of the current variable length block using the control pattern. The decompressing thus operates to decompress the compressed data stream.

Further Embodiments

The following presents various exemplary embodiments of the above method, as well as specific exemplary embodiments of the single instruction used to implement the method.

In one embodiment, the method may perform the expansion of the compressed data into a single 128-bit register and move the pointer, preferably one of the general purpose registers (GPRs), by the correct amount to make it point to the next block's control byte. However, note that to implement this functionality with a single instruction may require two destination registers.

In one embodiment, analyzing the control or tag byte may include loading the byte pointed to by a mem8_address, creating a 128 bit routing pattern in an xmm register (or TMP if uCoded), and storing the next index into a GPR (or TMP).

Note that the value of the next index is the length of the entire block, and that current_address+next_index points to the next block to be decoded.

The data may then be loaded, e.g., using a PPERM instruction (or as an alternative the PSHUFB instruction introduced by SSSE3). In one embodiment, the target register may be an xmm register. The source address may be mem8_address+1, and the control register may be the xmm register mentioned above (used to store the 28 bit routing pattern). Note that the source address is a mem8_address because the data stream is not aligned In one embodiment, the next address may be calculated as mem8_address+next and stored into the GPR that was used as pointer/index.

To execute the above as a sequence of x86 instructions, the single instruction described herein may operate to perform the above analyzing the control or tag byte, loading the byte, creating the 128 bit routing pattern, and storing the next index—the other steps can be performed using existing instructions (including SSE5).

In one embodiment, the single instruction may have the following format:

VDECACB dest, gpr, mem8_address

The instruction may use the SSE5 instruction format—where destination operand dest is the xxm register encoded in the DREX byte; this register may receive the control (unpack) pattern, GPR may receive the length of the data field+1 and may be encoded as op1 in the MOD_RM byte; mem8_address may use any valid memory addressing mode and may be encoded using the op2 field in the MOD_RM and, if required by the addressing mode, the SIB. The address may have to point to a byte address to accommodate the variable length of the data.

One exemplary embodiment of the code to access and decode a 128 byte block within a loop may then be:

```
L1:     VDECACB   xxm1,rAX, (base + rSI)
        PPERM     xxm1, (base + rSI + 1), xmm1, xmm1
        ADD       rSI, rAX            ; calculate next address
        ----------
        process or manipulate the unpacked data as desired.
        Exit loop from within here
        ----------
        JMP       L1
end_loop:
```

Note that rAX is one of the x84 general purpose registers (GPRs).

In another embodiment, the first two instructions may be implemented as a single instruction using micro-code, e.g., VDECLOAD dest, gpr, mem8_address This instruction may directly load the data into dest and return the offset for the next instruction in GPR. However, this approach may limit performance by inserting the memory load of the PPERM into the dependence chain between decoding the length of the data field and the calculation of the next block's address. Keeping the first two instructions separate may allow the next address calculation to proceed in parallel with the permute operation, and the next decode may be started based on the new address.

Thus, embodiments of the above described techniques may facilitate efficient, i.e., fast, decompression of variable length block compressed data.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for decompressing data, comprising:
receiving a compressed data stream comprising one or more contiguous variable length blocks, wherein each variable length block comprises:
a plurality of contiguous variable length data fields; and
a tag portion, comprising a plurality of contiguous tag fields corresponding respectively to the plurality of variable length data fields, wherein each tag field stores a tag value specifying a size of a respective variable length data field in the variable length block;
storing a current variable length block of the one or more contiguous variable length data blocks;
executing a single machine instruction of a processor, wherein said executing comprises:
analyzing the tag portion of the current variable length block;
creating a control pattern and storing the control pattern in a first register of the processor, wherein the control pattern is configured to unpack the variable length data fields of the current variable length block into corresponding uniform data fields;
decompressing the plurality of contiguous variable length data fields of the current variable length block using the control pattern, wherein said decompressing operates to decompress the compressed data stream.

2. The method of claim 1,
wherein said storing comprises storing the current variable length block in a second register;
wherein said decompressing the plurality of contiguous variable length data fields of the current variable length block comprises:
storing results of said decompressing in a third register of the processor.

3. The method of claim 1,
wherein said control pattern indicates if data being deposited in a destination byte of the third register is a copy of a selected source byte or zero values.

4. The method of claim 2, further comprising:
determining a size of the variable length data field based on said analyzing the tag portion.

5. The method of claim 4, further comprising:
storing the size of the variable length data field in a fourth register of the processor.

6. The method of claim 1,
wherein said creating the control pattern comprises determining offsets indicating starting locations of each of the variable length data fields in the block.

7. The method of claim 1, further comprising:
determining a next value based on the tag portion, wherein the next value points to a subsequent variable length block of the one or more contiguous variable length blocks; and
storing the next value into a second register of the processor;
wherein the next value is useable to determine a starting location of a subsequent variable length block.

8. The method of claim 1, further comprising:
performing said storing, said executing, and said decompressing for each of the one or more contiguous variable length blocks.

9. The method of claim 1, wherein the single machine instruction comprises:
a first input operand comprising a length of the data field of the current variable length block plus 1;
a second input operand comprising an address of the current data block, wherein the address of the current data block points to the tag field of the current variable length block; and
an output operand for returning a routing pattern for the current data block.

10. The method of claim 1, wherein said executing the single first machine instruction does not reference external memory.

11. The method of claim 1, wherein the processor has an x86 architecture.

12. The method of claim 1, wherein the first register comprises:
a multimedia extension register for performing multimedia operations; or
a general purpose register.

13. The method of claim 1, wherein the processor is configured to operate under an operating system, and wherein the single machine instruction of the processor does not require modification of the operating system to execute.

14. The method of claim 1, wherein said executing the single machine instruction comprises:
converting the single machine instruction to two or more microcode instructions; and
executing the two or more microcode instructions.

15. A processor, comprising:
an input configured to receive a compressed data stream comprising one or more contiguous variable length blocks, wherein each variable length block comprises:
a plurality of contiguous variable length data fields; and
a tag portion, comprising a plurality of contiguous tag fields corresponding respectively to the plurality of variable length data fields, wherein each tag field stores a tag value specifying a size of a respective variable length data field in the data block;
a first register for storing a current variable length block of the one or more contiguous variable length data blocks;
an execution unit configured to execute a single first machine instruction of the processor to:
analyze the tag portion of the current variable length block;
create a control pattern and store the control pattern in a second register of the processor, wherein the control pattern is configured to unpack the variable length data fields of the current variable length block into corresponding uniform data fields;
wherein the execution unit is further configured to execute one or more second machine instructions to decompress the plurality of contiguous variable length data fields of the current variable length block using the control pattern, wherein said decompressing operates to decompress the compressed data stream.

16. The processor of claim 15,
wherein said decompressing comprises storing results of said decompressing in a third register of the processor.

17. The processor of claim 15,
wherein the control pattern indicates if data being deposited in a destination byte of the third register is a copy of a selected source byte or zero values.

18. The processor of claim 17, wherein the execution unit is further configured to execute the single first machine instruction of the processor to:
determine a size of the variable length data field based on said analyzing the tag portion; and
store the size of the variable length data field in a fourth register of the processor.

19. The processor of claim 15,
wherein said creating the control pattern comprises determining offsets indicating starting locations of each of the variable length data fields in the block.

20. The processor of claim 15, wherein the single first machine instruction comprises:
a first input operand comprising a length of the data field of the current variable length block plus 1;
a second input operand comprising an address of the current data block, wherein the address of the current data block points to the tag field of the current variable length block; and
an output operand for returning a routing pattern for the current data block.

21. The processor of claim 15, wherein said executing the single first machine instruction does not reference external memory.

22. The processor of claim 15, wherein the processor has an x86 architecture, and wherein the first register comprises:
a multimedia extension register for performing multimedia operations; or
a general purpose register.

23. The processor of claim 15, wherein the processor is configured to operate under an operating system, and wherein the single first machine instruction of the processor does not require modification of the operating system to execute.

24. The processor of claim 15, wherein to execute the single first machine instruction of the processor, the execution unit is configured to:
convert the single machine instruction to two or more microcode instructions; and
execute the two or more microcode instructions.

* * * * *